United States Patent
Su

(10) Patent No.: US 6,930,767 B2
(45) Date of Patent: Aug. 16, 2005

(54) MEASUREMENT SYSTEM FOR MULTIPLE OPTICAL COMPONENTS

(75) Inventor: Jun Su, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 14 days.

(21) Appl. No.: 10/364,544

(22) Filed: Feb. 11, 2003

(65) Prior Publication Data

US 2004/0156039 A1 Aug. 12, 2004

(51) Int. Cl.$^7$ .............................................. G01N 21/00
(52) U.S. Cl. ........................................................ 356/73.1
(58) Field of Search ..................... 356/73.1; 385/14–17, 385/31–36, 115–119

(56) References Cited

U.S. PATENT DOCUMENTS 6,108,074 A * 8/2000 Bloom ........................ 356/73.1
6,317,214 B1 * 11/2001 Beckett et al. ............... 356/450
6,636,664 B2 * 10/2003 Snyder et al. ................. 385/36

* cited by examiner

Primary Examiner—Tu T. Nguyen
(74) Attorney, Agent, or Firm—Trop, Pruner & Hu, P.C.

(57) ABSTRACT

A test and measurement system may include a light source coupled to a 1×(N+M) switch that supplies signals to devices under test as well as reference channels. The outputs from each channel of each device under test, as well as the reference channels, are provided to M 2×(N+1) routing switches in one embodiment. The routing switches are then coupled to M channel detector modules. As a result, it is not necessary to connect and disconnect the switches, making long-term environmental tests viable while avoiding losses from disconnecting and connecting switches in the course of ongoing testing.

16 Claims, 3 Drawing Sheets

US 6,930,767 B2

MEASUREMENT SYSTEM FOR MULTIPLE OPTICAL COMPONENTS

BACKGROUND

This invention relates generally to optical communication devices and, particularly, to devices for measuring and testing optical communication devices.

Many optical devices, such as arrayed waveguides, may include a large number of channels. In order to test devices with a number of channels, it is generally necessary to provide at least one input channel and one output channel. A test device can be coupled to the output channel. To test another channel, connections must be undone and remade.

Remaking the connections during testing may involve a considerable amount of labor for devices that are relatively complex with a number of channels. In addition, repeatedly making and breaking of the connections may skew the test results. For example, losses may arise from fiber connection and disconnection during the test.

Thus, there is a need for better ways to test multiple optical components in multiple systems.

DETAILED DESCRIPTION

In accordance with one embodiment of the present invention, a light source 12, such as a laser light source, may be coupled to a switch 14. The switch 14 may be a 1×(N+M) switch in one embodiment of the present invention, where N is the number of devices under test (DUT) and M is the number of output channels per device under test.

Figure 1:
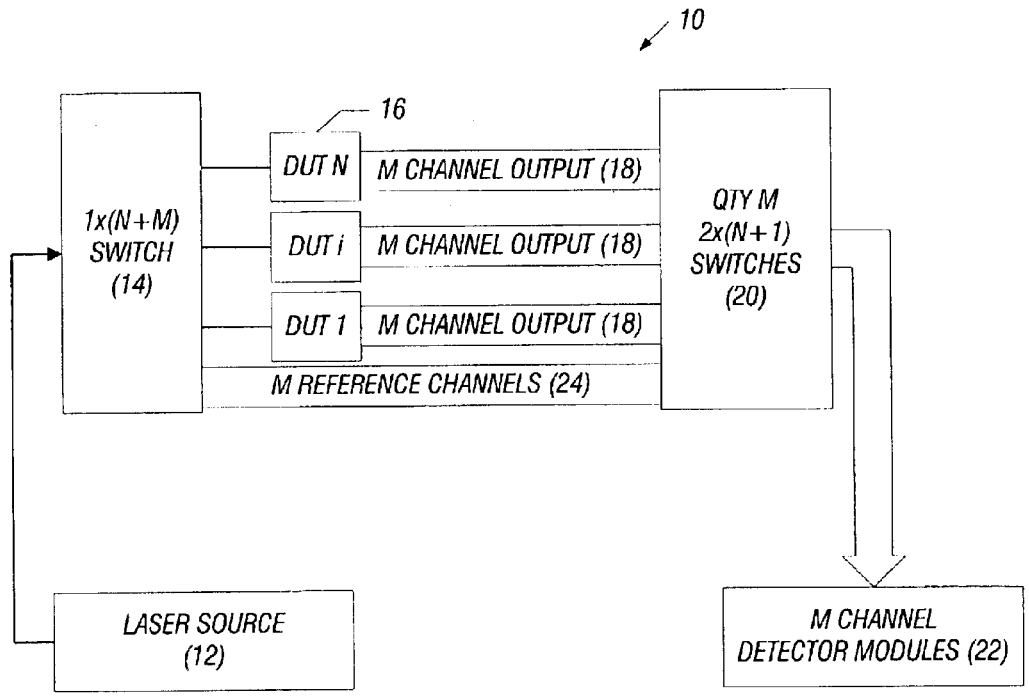
FIG. 1 is a schematic depiction of one embodiment of the present invention.

Thus, in FIG. 1, there are devices under test 16, 1–N, each having M output channels 18. M reference channels 24 may couple from the switch 14 to a switch bank 20. The number of switches in the bank 20 may equal the number of channels in one embodiment. Each of the M switches in the bank 20 may be a 2×(N+1) switch. The switch bank 20 may be coupled to M channel detector modules 22, such as power monitors.

Figure 2:
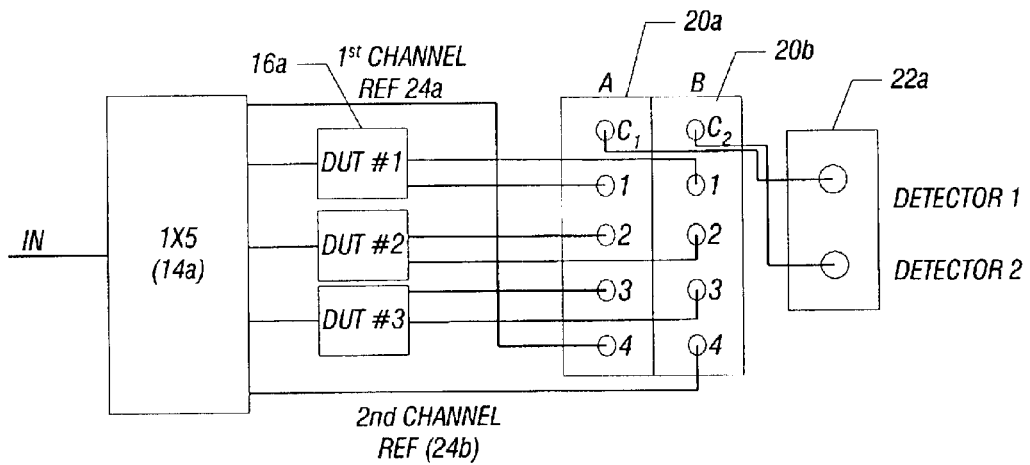
FIG. 2 is a schematic depiction, corresponding to FIG. 1, in an example with three devices under test, each having two channels, in accordance with one embodiment of the present invention.

To provide a concrete example, FIG. 2 shows the configuration, in accordance with one embodiment of the present invention, where there are three devices under test 16a, each having two output channels, i.e. N=3 and M=2. In this case, the switch 14a is a 1×5 switch that receives an input from a laser source (not shown). Each of the devices under test 16a receives a signal from the switch 14a. The devices under test 16a each provide two outputs because they each have two output channels. In addition, the switch 14a provides a first reference channel 24a and a second reference channel 24b. The bank 20 may include, in this example, two 1×4 switches 20a and 20b. Alternatively, the bank 20 may include 2×4 switches with common ports labeled C1 and C2. The common ports, C1, C2, are coupled to a pair of detectors 22, labeled detector 1 and detector 2.

Figure 3:
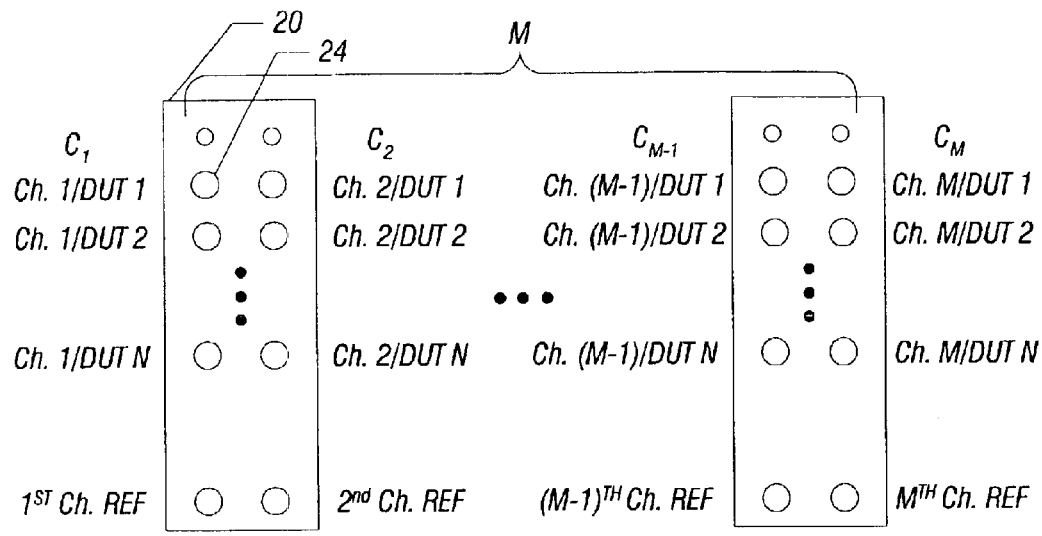
FIG. 3 shows the layout of the switching network for the embodiment of FIG. 1 in accordance with one embodiment of the present invention.
Figure 4:
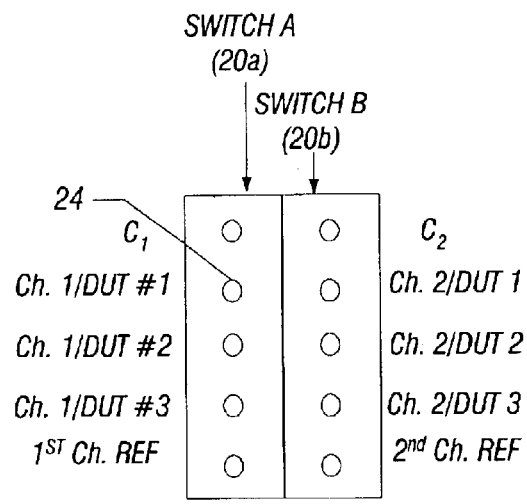
FIG. 4 shows the switch layout for the embodiment shown in FIG. 2 in accordance with one embodiment of the present invention.

Referring to FIG. 3, the bank 20, for the embodiment shown in FIG. 1, may include M 2×(N+1) switches 20. Thus, each bank 20 may include a pair of switches 24 that receive a pair of channels for each device under test 16 arranged in a plurality of rows and columns. Thus, each column corresponds to each of the devices under test 16 and one particular channel and each row corresponds to a different channel of each device under test 16. The last row is provided for the reference channels that provide reference signals for comparison to the test outputs.

Again, to provide a concrete example for the switching arrangement shown in FIG. 2, the first switch 20a includes the switches for the first channel of each device under test 16a and a reference switch, as well as a common port C1 that connects to the detector 1. Similarly, the switch 20b includes the common port C2 that is coupled to detector 2. Each of the devices under test 16a also has a connection for a second channel and for a reference channel.

Figure 5:
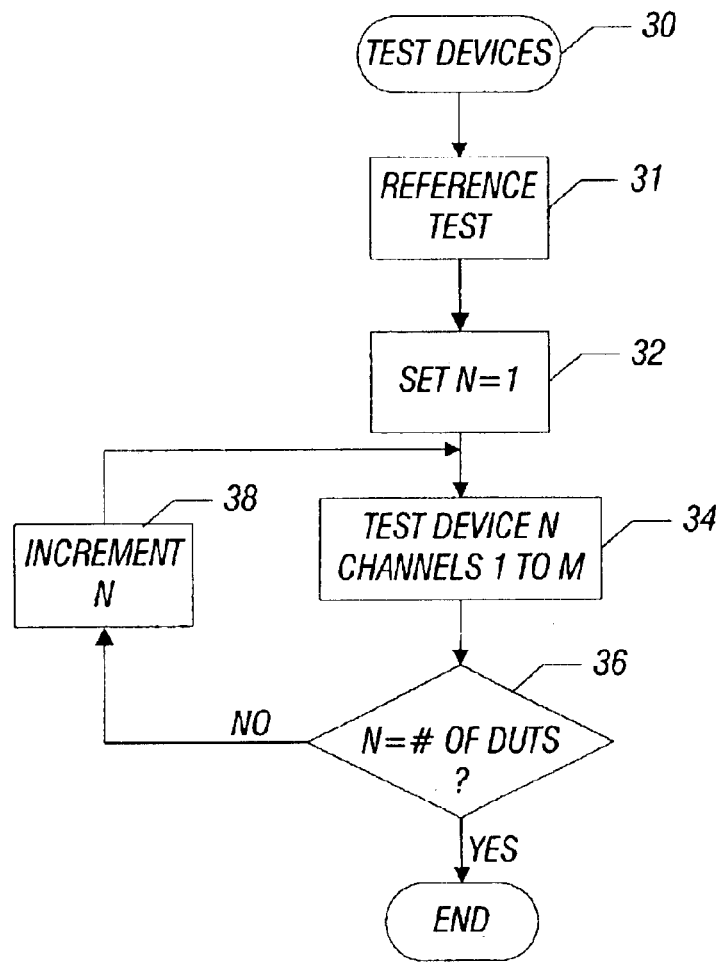
FIG. 5 is a flow illustrating the operation of a measurement system in one embodiment of the present invention.

Thus, referring to FIG. 5, in order to set up the switching network, initially, all the switches in FIG. 3 are set to the reference ports and the references signals are measured through M common ports that are connected to M detectors (block 31), and then, the number of devices under test is set equal to one as indicated at 32. The device under test number 1, channels 1 to M, are then tested as indicated in block 34. This corresponds to proceeding through the first row in FIG. 3. A check at diamond 36 determines whether N equals the number of devices under test. If so, the flow is complete. Otherwise, the variable N is incremented as indicated at block 38.

The next time though the flow, N now equals 2, so device number 2 channels 1 to M are tested as indicated in block 34. Again, N does not equal the number of devices under test at diamond 34, so N is then incremented again. Thus, the test proceeds row by row through the switching network shown in FIG. 3, until all the devices under test have been tested and all their channels have been tested.

In some embodiments, multi-channel operations over multiple components may use M switches in a configuration of n×(N+1) where M is equal to or larger than the channel count of the components, N is equal to or larger than the number of components under test, n is at least equal to 1, but advantageously is equal to or larger than 2.

In some embodiments of the present invention, once all the channels of all the devices under test 16 are connected to the detection modules 22 through the routing switches, they may be monitored without any physical interference to the test system until all the anticipated measurements are done. The measurement system can also be used for long-term reliability testing with high repeatability in some embodiments. As all the channels are coupled before a series of tests, losses coming from fiber connection and disconnection during the tests may be reduced or avoided.

According to one embodiment of the present invention, the 1×(N+M) switch 14 governs an optical input through the reference channels and input ports of all the devices under test 16 while M 2×(N+1) switches 20 control routes of data acquisition in which "2×" common ports (C) are designated to testing and referencing, respectively.

During referencing, M channels in M 2×(N+1) switches are set for referencing all M ports of N components. During testing, another M channels in M 2×(N+1) switches are set for testing all the M ports of N components. During testing, all the ports of all the devices under test are coupled in the ways shown in FIG. 3 and measurements proceed from the first layer which is occupied by all M ports of device under test 1 to the Nth layer which is occupied by all the M ports of device under test N. Thus, all the ports of all the components are measured.

Some embodiments may be useful for long-term reliability testing under various environmental conditions. Once the components are connected to the system as described above, there is no need to interfere with them physically. Only variations in parameters and the components under environmental conditions are then detected.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An optical measurement system comprising:
   M switches, connectable to receive outputs from devices under test, said switches being n×(N+1) switches where M is equal to or larger than the number of channels and N is equal to or larger than the number of devices under test and n is at least 1; and
   a 1×(N+M) switch connectable to the devices under test.

2. The system of claim 1 where an n is equal to 2.

3. The system of claim 1 where an N is equal to the number of devices under test.

4. The system of claim 1 where M is equal to the number of channels.

5. The system of claim 1 including a laser source coupled to said 1×(N+M) switch.

6. The system of claim 1 including M channel detector modules coupled to said M switches.

7. A method comprising:
   coupling a light source to a 1×(N+M) switch:
   coupling said switch to a plurality of devices under test; and
   coupling said devices under test to M switches, connectable to receive outputs from the devices under test, said M switches being n×(N+1) switches where M is equal to or larger than the number of channels and N is equal to or larger than the number of devices under test and N is at least 1.

8. The method of claim 7 providing M 2×(N+1) switches coupled to said devices under test.

9. The method of claim 8 includes providing a system where N is equal to the number of devices under test.

10. The method of claim 8 including providing a system where M is equal to the number of channels.

11. The method of claim 7 including coupling M channel detector modules to said M switches.

12. An optical measurement system comprising:
   a laser light source;
   a 1×(N+M) switch connectable to said light source and to N devices under test; and
   M switches, connectable to receive outputs from the N devices under test, said M switches being 2×(N+1) switches.

13. The system of claim 12 including M channel detector modules coupled to said M switches.

14. The system of claim 12 wherein M is at least two.

15. The system of claim 14 wherein N is at least two.

16. The system of claim 12 wherein M is equal to or greater than the number of devices under test.

* * * * *